UNITED STATES PATENT OFFICE.

WILHELM HERZBERG, OF BERLIN, GERMANY, ASSIGNOR TO ACTIEN GESELLSCHAFT FÜR ANILIN FABRIKATION, OF BERLIN, GERMANY.

AZO DYE AND PROCESS OF MAKING SAME.

No. 842,548.     Specification of Letters Patent.     Patented Jan. 29, 1907.

Application filed October 26, 1906. Serial No. 340,689.

*To all whom it may concern:*

Be it known that I, WILHELM HERZBERG, of Berlin, in the Kingdom of Prussia, German Empire, have invented new and useful Improvements in new Azo Dyestuff and Process of Making Same; and I do hereby declare that the following is a full, clear, and exact description thereof, which will enable others skilled in the art to which it appertains to make and use the same.

My present invention relates to the manufacture of a new azo dyestuff, as I have found that by diazotizing and then combining di-ortho-dianisidindisulfonic acid with beta-naphthol there is obtained a red azo dye of great technical value, this dyestuff when dyed on wool in an acid-bath being distinguished by a clear bluish-red tint, and the dye thus obtained being fast to washing and acid or alkaline milling.

As to the production of the di-ortho-dianisidindisulfonic acid, which is to be diazotized and then combined with beta-naphthol, according to my present invention, it is convenient to say that this acid may be prepared by the action of fuming sulfuric acid on di-ortho-dianisidin at temperatures between 0° and about 30° centigrade. The neutral sodium salt of this new sulfonic acid is obtained in the shape of small leaves of a silvery luster, containing water of crystallization by cooling a hot concentrated aqueous solution of this salt, as it dissolves in about ten times its weight of hot water, but is difficultly soluble in cold water, whereas the free disulfonic acid is very easily soluble in water. This new sulfonic acid most probably has the following constitution:

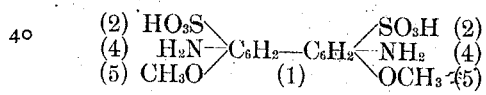

The following example may serve to illustrate my invention, the parts being by weight:

Example: 22.5 parts of the sodium salt of di-ortho-dianisidin-disulfonic acid are dissolved in about two hundred parts of water, with the addition of thirty-five parts of hydrochloric acid, (20° Baumé specific gravity.) To this solution are added seven parts of sodium nitrite in an aqueous solution while stirring well. The diazotization being finished, the diazo solution is allowed to run into a beta-naphthol solution, which is prepared from 14.5 parts of beta-naphthol by dissolving it in about two hundred parts of water with the addition of twelve parts of caustic soda-lye, (40° Baumé, specific gravity,) and of an aqueous solution of twenty-two parts of calcined sodium carbonate. Combination occurs immediately, the dyestuff separating out and is complete after a short time. After filtering the residue is dissolved in about two thousand five hundred parts of hot water, the solution added with seven hundred and thirty parts of common salt, and then boiled for some time, the dyestuff separating out as a crystalline powder. It is filtered and dried.

The product thus obtained forms a red crystalline powder soluble in water to a blue red solution, which solution separates a violet precipitate by the addition of concentrated hydrochloric acid and a brick-red precipitate by the addition of concentrated soda-lye. In concentrated sulfuric acid it dissolves with a blue-red coloration, from which solution on the addition of ice separates a blue-red precipitate. When dyed on wool without a mordant in an acid-bath, (acetic acid or the like,) clear bluish-red tints are obtained, which are fast to washing and milling.

It is obvious that the present invention is not limited to the foregoing example nor to the details given therein. Especially when instead of the di-ortho-dianisidindisulfonic acid in the foregoing example another di-ortho-dialkyloxybenzidindisulfonic acid is used—as, for instance, di-ortho-diphenetidin-disulfonic acid—there is also obtained a red azo dyestuff dyeing wool without a mordant from an acid-bath clear red tints, which are fast to washing and milling.

Having now described my invention and the manner in which the same is to be performed, what I claim is—

1. The process of producing red azo dyestuffs consisting in diazotizing a di-ortho-dialkyloxybenzidindisulfonic acid and combining the diazo compound thus obtained with beta-naphthol.

2. The process of producing a red azo dyestuff consisting in diazotizing the hereinbefore-defined di-ortho-dianisidindisulfonic acid and then combining the diazo compound thus obtained with beta-naphthol.

3. As a new article of manufacture an azo dyestuff which may be obtained by diazotizing di-ortho-dialkyloxybenzidindisulfonic acid and combining the diazo compound thus obtained with beta-naphthol, which azo dyestuff dyes wool without a mordant from an acid-bath clear red tints which are fast to washing and milling.

4. As a new article of manufacture the hereinbefore-described monoazo dyestuff dyeing wool without a mordant in an acid-bath bluish-red tints which are fast to washing and milling, this dyestuff being in the shape of the sodium salt a red crystalline powder dissolving in water to a blue-red solution, which solution separates a violet precipitate by the addition of concentrated hydrochloric acid and a brick-red precipitate by the addition of concentrated soda-lye, which dyestuff dissolves in concentrated sulfuric acid with a blue-red coloration from which solution on addition of ice separates a blue-red precipitate and which dyestuff when treated with a strong reducing agent yields di-ortho-dianisidindisulfonic acid besides 1.2 amidonaphthol.

In witness whereof I have hereunto signed my name, this 8th day of October, 1906, in the presence of two subscribing witnesses.

WILHELM HERZBERG.

Witnesses:
WOLDEMAR HAUPT,
HENRY HASPER.